United States Patent [19]

Marks

[11] 3,783,726
[45] Jan. 8, 1974

[54] WIRE CUTTING APPARATUS
[75] Inventor: John L. Marks, Peabody, Mass.
[73] Assignee: International Telephone and Telegraph Corporation, Nutley, N.J.
[22] Filed: Mar. 19, 1973
[21] Appl. No.: 342,336

Related U.S. Application Data
[63] Continuation of Ser. No. 147,097, May 26, 1971, abandoned.

[52] U.S. Cl............ 83/355, 83/592, 83/913
[51] Int. Cl............................... B26d 5/22
[58] Field of Search.............. 83/349, 355, 580, 83/591, 592, 913

[56] References Cited
UNITED STATES PATENTS

| 2,343,887 | 3/1944 | Crane et al. | 83/592 X |
| 2,570,466 | 10/1951 | MacHenry | 83/913 X |
| 3,646,894 | 3/1972 | Hasten et al. | 83/355 X |
| 1,143,285 | 6/1915 | Koella | 83/580 |
| 2,707,026 | 4/1955 | Hoern | 83/580 X |
| 3,625,101 | 12/1971 | Leveque | 83/592 X |

Primary Examiner—Andrew R. Juhasz
Assistant Examiner—James F. Coan
Attorney—C. Cornell Remsen, Jr. et al.

[57] ABSTRACT

This is an invention for wire cutting apparatus. A drive shaft is coupled both to means for continuously feeding wire and rotating means for cutting and providing clearance for the continuously fed wire.

5 Claims, 4 Drawing Figures

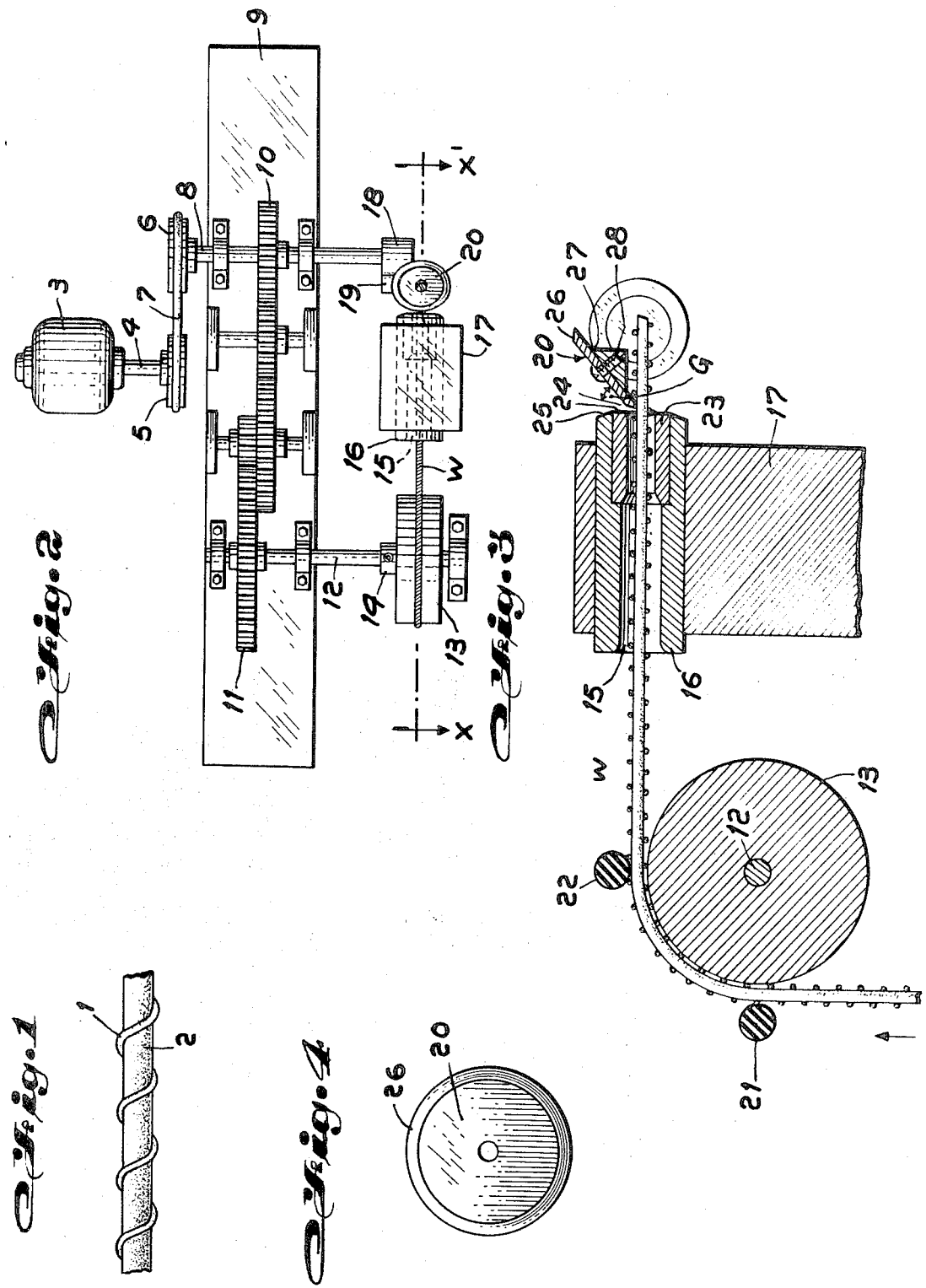

WIRE CUTTING APPARATUS

This is a continuation of application Ser. No. 147,097, filed May 26, 1971, and now abandoned.

BACKGROUND OF THE INVENTION

This invention relates to wire cutting apparatus.

Generally, wires of the order of 100 mm or less in length have been cut using reciprocating cutting machines. In a reciprocating cutter, the blade generally comes down in guillotine-like fashion over the hole in a die, through which hole the wires is being fed, and then the cutter is raised and then comes down again to cut the next wire. As this type cutter cuts the wire being fed, the cutter blade comes down directly over the hole and extends somewhat past the hole. Thus, if the wire being cut would be continuously fed through the hole in the die, it would be propelled into the reciprocating cutter blade, thus jamming the machine. In order to avoid such jamming, the wire is not continuously fed, but instead, the wire feed is halted as each wire is being cut in order to allow time for the reciprocating cutter blade to be raised and allow clearance for the feed wire. Therefore, by halting the wire feed as each wire is being cut, the reciprocating wire cutting machine places a definite limit on the speed of cutting these wires and thus, a definite limit on the production of the wire leads. Of course, the smaller the wire to be cut the longer is the period of time when the wire feed itself will be shut down.

It has been found that wire of the order of 50 mm in length can only be cut at speeds of approximately 80 to 125 pieces per minute using reciprocating cutting machines. Furthermore, this type of machine requires considerable skill for its operation.

SUMMARY OF THE INVENTION

It is therefore an object of this invention to provide a wire cutting machine requiring less skill for its operation.

It is a further object of this invention to provide a wire cutting machine operating at speeds greatly in excess of the speed of a reciprocating cutting machine.

It is a still further object of this invention to provide for a wire cutting machine having a continuous wire feed.

According to a broad aspect of this invention, there is provided a wire cutting apparatus comprising rotational drive means, means coupled to said drive means for continuously feeding wire to be cut and rotating means coupled to said drive means for cutting and providing clearance for the continuously fed wire.

BRIEF DESCRIPTION OF THE DRAWINGS

FIG. 1 shows the wire assembly;

FIG. 2 is a top view of the wire cutting apparatus;

FIG. 3 is a sectional view of the cutting apparatus taken along plane XX' shown in FIG. 2; and FIG. 4 is a top view of the disk cutter.

DESCRIPTION OF THE PREFERRED EMBODIMENTS

The wire cutting apparatus in this embodiment is used to manufacture filaments for incandescent lamps or electrodes for fluorescent lamps but, of course, is not confined to the manufacture of these products, and can be used to cut any short wires of accurate length.

FIG. 1 shows tungsten wire 1 wound around a mandrel 2 which may consist of metal such as steel or molybdenum. The thickness of the overall assembly in this example is in the order of 0.010 inches. The winding is wrapped around the mandrel and then subjected to a deforming process which generally consists of strain annealing in a controlled hydrogen atmosphere. This continuous wound tungsten filament is reduced to short uniform lengths using our wire cutting apparatus, after which cutting operation the mandrel is removed, usually by etching in an acid.

The top view of the wire cutting machine is shown in FIG. 2, wherein constant speed motor 3 drives shaft 4. Pulleys 5 and 6 coupled together by belt 7 are used to rotate the drive shaft 8 at a reduced rotational speed with respect to shaft 4. In this example, motor 3 rotates shaft 4 at 3,700 rpm and the pulley arrangement rotates drive shaft 8 at 1,500 rpm, the speed reduction being provided by suitably selected pulleys. Drive shaft 8 is directly connected to a gear train assembly 9 and specifically to input gear 10. An output gear 11 is then used to drive shaft 12 at a reduced rotational speed with respect to drive shaft 8, which reduced speed is determined by the final gear reduction ratio of gear train 9. The gear train having the desired reduction ratio can either be purchased or assembled using appropriate sized gears. Shaft 12 is attached to a drum 13 by use of suitable set screws in portion 14 of drum 13. In this example, the drum is made of standard machine steel. Drum 13 engages the wire assembly W which consists of mandrel 2 and wound filament 1 and propells the assembly through a hole 15 in a die 16, which die rests within a support 17. The wire assembly W exits the opposite end of hole 15 in a continuously fed fashion where it is cut by the cutter assembly. Thus the continuous feed means consists of the gear train assembly 9 which is connected to drive shaft 8, drum 13 which is connected to the output of the gear train via shaft 12, and the support 17 which holds die 16. The wire assembly is cut at the rate of the rotational speed of shaft 8, which shaft is attached via suitable set screws to cutter holder 18. Cutter holder 18 has a cylindrical shape and a flat surface portion 19 which extends outward in a flange-like manner. Cutter blade 20 in this example is a disk-shaped cutter and is attached to the flat surface portion 19 of cutter holder 18 using a suitable fastening arrangement.

A sectional view of FIG. 2 along plane XX' is shown in FIG. 3 where the cutter is in the rotational position for cutting wire assembly W. The wire is fed to drum 13 via a suitable standard spool feed. Rubber rollers 21 and 22 are shown pressing the wire assembly against drum 13 so as to enable drum 13 to propel wire W through hole 15 in support jacket 16. Rollers 21 and 22 were not shown in FIG. 2 for purposes of clarity. Support jacket or die 16 is made of steel in this example and is approximately 1⅞ inches long and approximately 0.312 inch in diameter. Jacket 16 has a die 23 placed therein to narrow the feed hole for the wire assembly to about 0.075 inch and to provide support and a cutting edge for the wire as it engages the cutter blade 20. Die 23 and cutter blade 20 in this example are both made of a tungsten-carbon alloy, known in the trade as Grade 55B Carboloy. It should be noted that while the adjacent edge 24 of die 23 is perpendicular to the axis of hole 15 for an approximate distance of 1/64 of an inch from hole 15, thereafter, the remainder 25 of that surface tapers from the plane of edge 24 at approximately 2½° in the direction away from cutter blade 20 so as to provide some clearance for the rotating cutter blade. It should also be noted that the cutter blade in this example has a bevelled edge 26, which edge has an angle G greater than 60° with the plane of the surface 27 of cutter blade 20. The bevelled edge 26 serves to provide clearance for cutter blade 20 as it rotates past die 23. When blade 20 begins to cut wire assembly W, the flat surface portion 19 of cutter holder 18 and the plane 27 of cutter 20 makes an angle of approximately 30° with the horizontal axis. The angle can be adjusted to provide maximum cutting force for the cutter while also providing sufficient clearance for the continuously fed wire so that no portion of the rotating cutter blade comes in contact with the wire assembly until the cutter is in position to actually cut the wire. The length of the cut wire actually is determined by the formula $$L = K\pi D/R$$

where
$L$ = length of wire in millimeters;
$D$ = diameter of the drum in inches;
$R$ = the gear train ratio; and
$K$ is a conversion factor equal to 25.4 for converting inches to millimeters.

In this example, with R equalling 10 and D equalling 6.25, the length of wire to be cut equals 50 mm. From the above formula, it can be seen that by varying the diameter of the drum 13 or the ratio of the gear train 9, the length of cut wire could be varied. However, the largest length of wire which can be cut is limited since there is a point beyond which the continuously fed wire will prematurely interfere with some portion of the rotating cutter blade 20, and when the angle of the surface portion 19 and disk plane 27 with respect to the horizontal axis is 30°, the maximum length of wire which could be cut is approximately 60 mm. By reducing the angle of surface portion 19 and disk plane 27 with respect to the horizontal axis to approximately 20°, the maximum length of cut wire could be extended to approximately 70 mm. After which point, if longer wire sections are required, it might be necessary to remove portions of blade 20 to provide for additional clearance.

Circular blade 20 as shown in FIG. 4 in this example is approximately 1 7/16 inches in diameter and approximately 0.067 inches thick. Also, in this example, cutter holder 18 is approximately 1¼ inches in diameter and has a 3/4 inch hole therein so as to fit around shaft 8. Actually, cutter blade 20 should be so mounted on cutter holder 18 that the outer most tip of the cutter blade will engage the wire assembly just as it leaves hole 15 so that the cutter will clear the die and still cleanly cut the wire. In this particular example, the axis of the cutter holder is horizontally aligned with the axis of the wire to be cut, and this axis is approximately 1¼ inches from the point where the wire will be cut and the cutter blade 20 is so positioned on the cutter holder 18 to accomplish this purpose. It should also be noted that except for the extended portion 28 of cutter holder 18, the remaining portions of holder 18 are not in line with and will not interfere with the continuously fed wire. It should further be noted that the extended portion 28 of cutter holder 18 serves the purpose of providing balanced mechanical support for cutter blade 20.

The apparatus, in this example, is cutting the wire sections at a rate of 1,500 pieces per minute, and can satisfactorily operate at a rate of 3,000 pieces per minute. Thus the apparatus satisfactorily operates at more than 10 to 20 times the cutting rate of reciprocating type cutting machines.

It is to be understood that the foregoing description of specific examples of this invention is made by way of example only and is not to be considered as a limitation on its scope.

I claim:
1. A wire cutting apparatus, comprising:
   rotational drive means;
   means coupled to said drive means for continuously feeding at a substantially constant rate wire to be cut;
   support means having an aperture through which said wire is fed for providing a base support when said wire is cut;
   rotating means mounted on said apparatus to rotate in a plane substantially parallel with the axis of said aperture;
   means for coupling said drive means to rotate said rotating means for cutting said wire as it exits from said aperture and providing clearance for the continuously fed wire by rotating out of the path of said wire, said rotating means including a substantially cylindrical cutter holder; and
   a disk shaped cutter blade having a bevelled edge and mounted on said holder to impinge against said wire at the exit of said aperture.
2. An apparatus according to claim 1, wherein said drive means includes a drive shaft coupled to said continuously feeding means and rotating cutting means.
3. An apparatus according to claim 2, wherein said continuous feed means further includes:
   a gear train having an input and output, the input of said gear train being coupled to said drive shaft;
   a rotating drum for engaging the wire to be cut and for propelling the wire through aperture in said support, said drum being coupled to the output of said gear train; and
   first and second rollers for pressing said wire against said rotating drum.
4. An apparatus according to claim 1, wherein during the course of one revolution of said cutter the outermost portion of said bevelled edge is positioned adjacent the aperture in said support to engage and cut said wire as it leaves the aperture, the plane of said disk being at an angle of greater than 20° with the axis of the aperture in said support.
5. An apparatus according to claim 4, wherein said angle is 30°.

* * * * *